(12) United States Patent
Tran

(10) Patent No.: US 7,234,811 B1
(45) Date of Patent: Jun. 26, 2007

(54) METHODS AND APPARATUS FOR LENSES AND GLASSES

(76) Inventor: Tri Khai Tran, 7269 Winthrop La., Mobile, AL (US) 36695

( * ) Notice: Subject to any disclaimer, the term of this patent is extended or adjusted under 35 U.S.C. 154(b) by 0 days.

(21) Appl. No.: 11/350,481

(22) Filed: Feb. 9, 2006

(51) Int. Cl.
G02C 7/02 (2006.01)
G02C 7/06 (2006.01)
(52) U.S. Cl. ...................................... 351/177; 351/168
(58) Field of Classification Search ................ 351/159, 351/168–170, 177
See application file for complete search history.

(56) References Cited

U.S. PATENT DOCUMENTS 5,110,199 A * 5/1992 Ishida ......................... 351/169
2006/0103806 A1* 5/2006 Torrey ......................... 351/159

OTHER PUBLICATIONS

Print out of www.coopereyewear.com "computer lenses" page, titled "Computer Glasses," as on the internet on Feb. 9, 2006.
Wendy Strouse Watt, O.D., "Computer Vision Syndrome and Computer Glasses," as on the internet on Feb. 9, 2006 at www.mdsupport.org/library/cvs.html.
Computer Lens Fitting Guide product sheet, from VSP Optical Laboratory.
James E. Sheedy, OD, PhD, "Computer Glasses for Presbyopic Patients," as on the internet at www.visioncarproducts.com/34/len_comp.html on Feb. 9, 2006.
Gina White, "Computer Glasses for Blurred Vision and Other CVS Symptoms," as on the internet at www.allaboutvision.com/cvs/computer_glasses.htm on Feb. 9, 2006.
Liz DeFranco, A.B.O.C, N.C.L.C, "Bifocals & Trifocals: New Options for 'Short Arms'," as on the internet at www.allaboutvision.com/lenses/multifocal.htm on Feb. 9, 200.

* cited by examiner

*Primary Examiner*—Scott J. Sugarman
*Assistant Examiner*—Darryl J. Collins

(57) ABSTRACT

Methods and apparatus for lenses and glasses are provided in which a lens (10) is formed with a thickness of less than 5 millimeters without grinding, and has two viewing segments (12 and 14). The first viewing segment (12) has a magnification power to correct for effects of presbyopia for near range viewing, and the second viewing segment (14) has a magnification power to correct for effects of presbyopia for intermediate range viewing.

13 Claims, 1 Drawing Sheet

Less than 5mm at thickest section

US 7,234,811 B1

METHODS AND APPARATUS FOR LENSES AND GLASSES

TECHNICAL FIELD OF THE INVENTION

This invention relates generally to eyeglasses, and more particularly to methods and apparatus for lenses and glasses for near and intermediate viewing.

BACKGROUND OF THE INVENTION

As people age, the onset of presbyopia (the deterioration of near vision due to loss of flexibility in the human lens) is virtually inevitable. Indeed, some estimates are that 90 million people in the United States either have it or will have it by 2014.

The problems associated with presbyopia are compounded by the expanding use of personal computers, wherein users often view objects in three primary ranges: near for keyboards and papers (approximately 13 to 16 inches); intermediate for the computer monitor's screen and other intermediate ranged objects (approximately 16 to 72 inches); and distance (beyond approximately 72 inches) for objects beyond the intermediate range. These ranges are examples only, and vary depending on the severity of the presbyopia and the preference of the user.

Observers have recognized that, because of presbyopia, there is a need for eyeglasses that are tailored for use with computers. Such glasses are often referred to as computer glasses or computer lenses. In particular, it is recognized that users will benefit from lenses that correct for presbyopia with a near vision magnifying segment, an intermediate vision magnifying segment, and a distance segment. Similarly, lenses have been used that include only near and intermediate vision magnifying segments. In the latter case, for distance viewing, users either take off the glasses or peer over the top of the glasses.

Unfortunately, these computer lenses and glasses are relatively expensive, because, among other things, they are made from relatively thick lens blanks (often approximately 9 millimeters thick before grinding), and must be ground down to the proper magnifications. Also, these thick lens blanks are available only in quarter magnifying power increments, and thus are unsuitable for users who have needs that do not fit into those quarter increments. For example, with people in the age range of about 40-50 years, a very desirable power ratio for intermediate/near viewing with computers is approximately 1:2. Thus, if lenses are desired with a near power of 1.75, then an intermediate power of 0.875 is needed, which combination cannot be made with such lenses. As another example, with people in the age range of about 50-60 years, a very desirable power ratio for intermediate/near viewing with computers is approximately 2:3. Thus, if lenses are desired with a near power of 2.75, then an intermediate power of 1.82 is needed, which combination also cannot be made with such lenses.

Many inexpensive, over-the-counter glasses are also available for correcting the effects of presbyopia, and are often made from relatively thin lens blanks (less than approximately 5 millimeters thick). However, to the inventor's knowledge, these glasses either provide magnification for only one range, or, if they are bifocal, not for both near and intermediate ranges. Thus, they are generally not suitable for computer glasses.

Furthermore, to the inventor's knowledge, no "executive" lenses—those that have a line between the lower and upper segments of the lens, all the way across the lens—have been made with a reader power on the bottom and an intermediate power on the top.

Therefore, a need has arisen for eyeglasses and lenses that are made from thin lens blanks and which correct for the effects of presbyopia for both near and intermediate viewing.

SUMMARY OF THE INVENTION

Therefore, in accordance with the teachings of the present invention, eyeglasses, lenses, and methods related thereto are disclosed which overcome limitations associated with the prior art.

In a particular embodiment, eyeglasses are provided which include eyeglasses frames and a pair of lenses attached to the eyeglasses frames. Each lens has a thickness of less than 5 millimeters without grinding, and each lens further has only two viewing segments, with the first of the two viewing segments having a magnification power to correct for effects of presbyopia for near range viewing, and the second of the two viewing segments having a magnification power to correct for effects of presbyopia for intermediate range viewing.

In another particular embodiment, the present invention provides for a lens as described above.

In particular embodiments, the lenses, whether alone or as part of eyeglasses, may be executive-style, other non-progressive styles, or progressive. In another particular embodiment, the lenses have a thickness of less than 3 millimeters.

Also provided is a method of making a device for optical uses, which includes providing a mold shaped to form a lens having a thickness of less than 5 millimeters and only two viewing segments, wherein the first of the two viewing segments has a magnification power to correct for effects of presbyopia for near range viewing, and the second of the two viewing segments has a magnification power to correct for effects of presbyopia for intermediate range viewing, and introducing a moldable material into the mold and molding the lens.

In particular embodiments, the method also includes edging the lens. Also, the edged or unedged lens may be coupled to a frame.

Also, the first and second viewing segments may be formed with the moldable material that is introduced into the mold, or the first viewing segment may be formed separately and introduced into the mold before molding the lens.

BRIEF DESCRIPTION OF THE DRAWINGS

Reference is made in the description to the following briefly described drawings, wherein like reference numerals refer to corresponding elements.

DETAILED DESCRIPTION OF THE INVENTION

Figure 1:
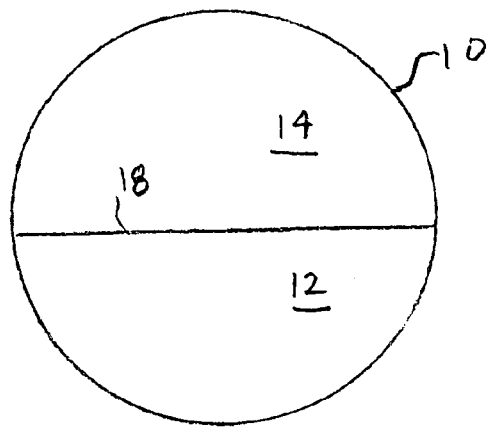
FIG. 1 illustrates one embodiment of a lens according to one aspect of the present invention.

FIG. 1 illustrates a particular embodiment of a lens according to the teachings of the present invention. As shown, lens 10 includes a near vision segment 12 and an intermediate vision segment 14. Near vision segment 12 has a magnification power of N, and intermediate vision segment 14 has a magnification power of I. Segments 12 and 14 are also referred to generally as viewing segments.

Figure 2:
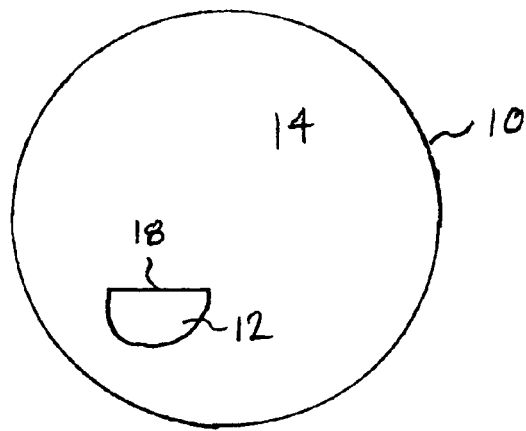
FIG. 2 illustrates another embodiment of a lens according to one aspect of the present invention.

The lens 10 shown in FIG. 1 is an executive style lens, and thus has a line that abruptly separates segments 12 and 14. As shown in FIG. 2, the lens may also be formed as lens that has a smaller near vision segment 12, which may be, for example and without limitation, a flat top segment, a round segment, a curve top segment, a blended segment, or a progressive segment. What ever type of segment 12 is chosen, the segment 12 may be formed anywhere in the lens, and thus may be as low or high on the lens (in relation to the face of a wearer) as desired, and may be as large or small as desired.

Figure 3:
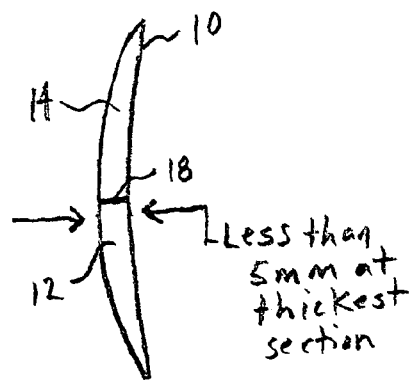
FIG. 3 illustrates a side view of one embodiment of a lens according to one aspect of the present invention.

As shown in FIG. 3, the thickness of the lens 10 is less than about 5 millimeters, and more preferably less than about 3 millimeters, without grinding. In a particular application, the lens thickness is about 2.2 millimeters.

To make lenses according to the present invention, lenses are made by a molding process, which may be, for example and without limitation, an injection molding process. However, any suitable molding process may be used. For a particular lens, a mold is shaped to form the lens with segments having predetermined magnifications of N and I. For example, if an N of 2.25 and an I of 1.12 are desired, then a lens is molded to have viewing segments with those powers. Thus, an important technical advantage of the present invention is that lenses molded according to it are formed with the desired magnification powers, and eliminate the need for lens grinding, in contrast to prior art lenses. After molding a lens according to the present invention, the lens may be edged for setting into or other attachment to eyeglasses frames. Furthermore, lenses according to the present invention may be molded in the shape desired for the eyeglasses frame in which they will be set or otherwise attached, thus eliminating the need for edging. Also, in addition to molding the lens as a single molded piece, the segment 12 may be formed first, for example and without limitation by molding, and then placed in a mold with the segment 14 molded around or to the segment 12.

Figure 4:
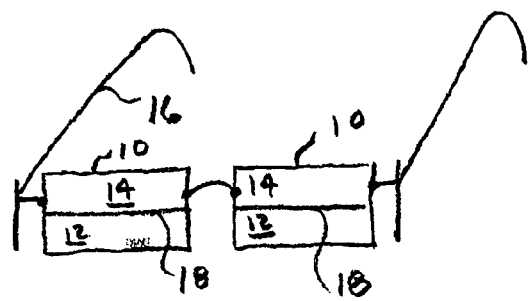
FIG. 4 illustrates one embodiment of a pair of glasses according to one aspect of the present invention.

FIG. 4 shows a frame 16, to illustrate that a pair of lenses may be set into or otherwise attached to frames to make a pair of eyeglasses. If needed, the lenses are edged as needed for setting into the frames or edged to be in the desired final shape.

Another important technical advantage of the present invention is that lenses may be made with any combination of magnification powers (including, without limitation, plus or minus powers), thus overcoming a problem with prior art systems in which only quarter step magnification powers are available. Although lenses with virtually any power ratio may be made with the present invention, it is contemplated that a set of lenses with power steps of 0.125 will accommodate the vast majority of needs.

Near vision segment 12 may include a flat top 18 as shown in FIGS. 1 and 2, or, as discussed above, may be any suitable segment, including, without limitation, a progressive style segment that progresses from near vision magnification N to the intermediate vision magnification I. Although lenses according to the present invention may be made as progressive lenses, it is preferred that they be executive style lenses. In particular, with progressive lenses, more peripheral distortion is presented to the wearer than with executive style lenses or those with other non-progressive segments. And, because of this peripheral distortion, eyeglass fitting to each wearer is important. With executive style lenses, such fitting is usually unnecessary. Also, with progressive lenses, more vertical room (with reference to a wearer's face) is needed to transition from the near magnification to the intermediate magnification. As a result, because the lens should be large enough to provide reasonable viewing areas for both magnification segments, it may be difficult to see over such progressive style lenses for distance viewing. With an executive style lens or one with other non-progressive segments, peripheral vision distortion is reduced, and lens heights may be reduced to facilitate distance viewing over the lens while still providing reasonable viewing areas through both magnification segments. However, the lenses according to the present invention— whether executive (or other non-progressive types) or progressive style—may be made as large as needed, and do not have to accommodate viewing over the lens for distance. In a preferred embodiment of the present invention, however, the lens is edged or formed to accommodate such over viewing.

Lenses according to the present invention may be made of any suitable material, including, without limitation, glass, plastic (such as, without limitation CR-39), acrylic, materials made under the trade names Hindex or Trivex, and polycarbonate, among others. Any suitable lens blank diameter or curvature may be used. Also, without limitation, the lenses may be, if desired, colored, such as by, without limitation, tinting, coating, or dyeing. Also, without limitation, the lenses may be coated with reflective coatings.

The particular embodiments and descriptions provided herein are illustrative examples only, and features and advantages of each example may be interchanged with, or added to the features and advantages in the other embodiments and examples herein. Moreover, as examples, they are meant to be without limitation as to other possible embodiments, are not meant to limit the scope of the present invention to any particular described detail, and the scope of the invention is meant to be broader than any example. Also, the present invention has several aspects, as described above, and they may stand alone, or be combined with some or all of the other aspects.

And, in general, although the present invention has been described in detail, it should be understood that various changes, alterations, substitutions, additions and modifications can be made without departing from the intended scope of the invention, as defined in the following claims.

What is claimed is:

1. A method of forming eyeglasses, comprising:
   providing eyeglasses frames;
   forming a pair of lenses; and
   attaching the lenses to the eyeglasses frames,
   wherein forming comprises forming each lens to have a thickness of less than 5 millimeters without grinding and to have only two viewing segments, with the first of the two viewing segments having a magnification power to correct for effects of presbyopia for near range viewing, and the second of the two viewing segments having a magnification power to correct for effects of presbyopia for intermediate range viewing.

2. The method of claim 1, wherein forming further comprises forming each of the lenses so as to have an abrupt transition between the first and second viewing segments.

3. The method of claim 1, wherein forming further comprises forming each lens such that the two viewing segments in each of the lenses are separated by a line that stretches all the way across the lens.

4. The method of claim 1, wherein forming further comprises forming each lens such that the first viewing segment in each of the lenses is a blended viewing segment.

5. The method of claim 1, wherein forming further comprises forming each lens such that the top of the first viewing segment is separated from the second viewing segment by a line.

6. The method of claim 1, wherein forming further comprises forming each lens such that the transition between the first and second viewing segments is progressive.

7. The method of claim 1, wherein forming further comprises forming each lens such that each of the lenses has a thickness of less than 3 millimeters.

8. A method of making a device for optical uses, comprising:

provimiding a mold shaped to form a lens having a thickness of less than 5 millimeters and only two viewing segments, wherein the first of the two viewing segments has a magnification power to correct for effects of presbyopia for near range viewing, and the second of the two viewing segments has a magnification power to correct for effects of presbyopia for intermediate range viewing; and introducing a moldable material into the mold and molding the lens.

9. The method of claim 8, and further comprising edging the lens.

10. The method of claim 9, and further comprising coupling the lens to a frame.

11. The method of claim 8, further comprising coupling the lens to a frame.

12. The method of claim 8, wherein the first and second viewing segments are formed with the moldable material that is introduced into the mold.

13. The method of claim 8, wherein the first viewing segment is formed separately and introduced into the mold before molding the lens.

* * * * *